United States Patent Office 3,450,706
Patented June 17, 1969

3,450,706
PROCESS FOR PREPARING NICOTINAMIDE
Norman L. Wendler, Summit, David Taub, Metuchen, and Chan Hwa Kuo, South Plainfield, N.J., assignors to Merck & Co., Inc., Rahway, N.J., a corporation of New Jersey
No Drawing. Filed June 3, 1966, Ser. No. 554,963
Int. Cl. C07d 31/44, 29/30
U.S. Cl. 260—295.5    3 Claims

ABSTRACT OF THE DISCLOSURE

Nicotinamide is prepared from 1-acyl-3-cyano-4-amino-1,2,5,6-tetrahydropyridine or 1-acyl-3-cyano-4-ketohexahydropyridine by reaction with an acid and tertiary butyl ions to form N-t-butyl-1-acyl-4-ketohexahydronicotinamide which is subsequently reduced and then acylated to effect reduction of the keto group at the 4 position to a hydroxy substituent and then to an acyloxy group. The thus formed N-t-butyl-1-acyl-4-acyloxyhexahydronicotinamide is then treated with a noble metal to effect the simultaneous removal of the substituents in the 1,4 position and aromatization of the ring to form N-t-buyl-nicotinamide, the latter which upon hydrolysis yields nicotinamide.

---

This invention relates to processes and intermediates useful for preparing nicotinamide. More particularly, it is concerned with processes for producing nicotinamide from 3-cyano-4-amino-1,2,5,6-tetrahydropyridine and new pyridine compounds useful as intermediates in these processes.

Methods used for the manufacture of nicotinamide employ as the starting compound products containing a pyridine ring or a substituted pyridine ring. In most cases, the nicotinamide is prepared by the degradation of a more complex compound to nicotinic acid and, subsequently, converting the acid to the amide by known methods. These known methods suffer from the disadvantages that the reactions are difficult to carry out on a commercial scale and that from time to time the starting pyridine compounds are in short supply.

It is an object of the present invention to provide new processes for producing nicotinamide. It is a further object to provide processes for producing nicotinamide starting with 3-cyano-4-amino-1,2,5,6-tetrahydropyridine. Another object is to provide processes for the preparation of N-t-butyl-1-acyl-4-ketohexahydronicotinamide, N-t-butyl-1-acyl-4-hydroxyhexahydronicotinamide, and N-t-butyl-1-acyl-4-acyloxyhexahydronicotinamide and methods for converting these compounds to nicotinamide. Other objects will be apparent from the detailed description of this invention hereinafter provided.

The processes for preparing nicotinamide in accordance with our invention can be depicted structurally as follows:

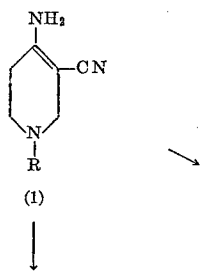

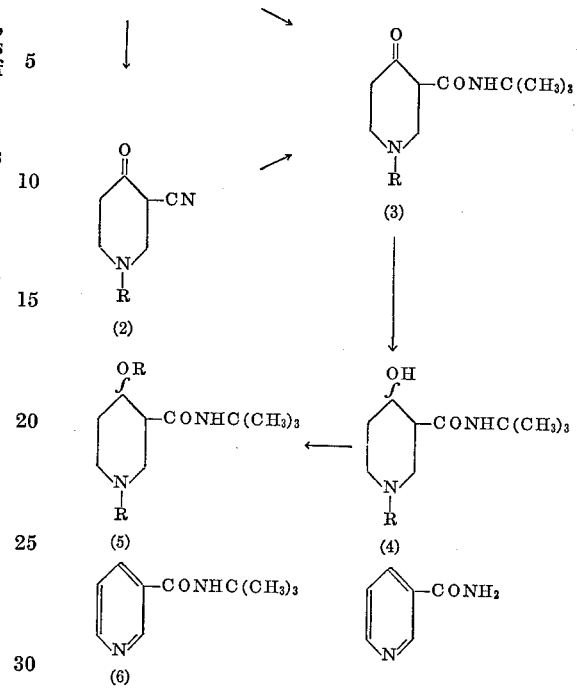

wherein R is an acyl group such as lower alkanoyl.

In accordance with one embodiment of this invention, 1-acyl-3-cyano-4-amino-1,2,5,6-tetrahydropyridine or 1-acyl-3-cyano-4-ketohexahydropyridine is reacted with tertiary butyl ions in the presence of a strong acid to produce N-t-butyl-1-acyl-4-ketohexahydronicotinamide (3), which is then reduced to obtain N-t-butyl-1-acyl-4-hydroxyhexahydronicotinamide (4). The latter compound is then acylated to produce the corresponding 4-acyloxy compound (5), which, on reaction with a noble metal, is converted to N-t-butylnicotinamide (6). This compound, upon hydrolysis of the tertiary butyl group, affords nicotinamide.

In accordance with the first step of the above-described process, 1 - acyl - 3-cyano-4-amino-1,2,5,6-tetrahydropyridine or 1-acyl-3-cyano-4-ketohexahydropyridine is reacted in the presence of a strong acid with a source of tertiary butyl ions to produce N-t-butyl-1-acyl-4-ketohexahydronicotinamide. In carrying out this step of our process, we prefer to use a 1-acyl compound wherein the acyl group is lower alkanoyl, since such compounds are readily prepared and result in maximum yields of the desired product under optimum conditions. This step of our process is most conveniently effected by intimately contacting the starting materials with isobutylene in the presence of a strong acid, such as sulfuric acid in an acetic acid medium. Other strong non-oxidizing mineral acids, such as hydrochloric and hydrobromic acids, can similarly be used in carrying out this reaction. The reaction is conveniently effected by dissolving the starting material in acetic acid, adding sulfuric acid to the solution, and then bubbling gaseous isobutylene into the resulting solution. After completion of the reaction, which is preferably effected at low temperatures of about 20° C., the reaction mixture is diluted with water and concentrated under reduced pressure to remove the tertiary butyl alcohol. After removal of the alcohol, the remaining aqueous solution is made alkaline with sodium carbonate, saturated with salt, and the product extracted with a suitable solvent such as ethyl acetate. Evaporation of the resulting extract affords the desired N-t-buyl-1-lower alkanoyl-4-ketohexahydronicotinamide.

Alternatively, the first step of our process is carried out by reacting the starting materials with a suitable source of tertiary butyl ions, such as tertiary butyl acetate, in the presence of a strong acid such as perchloric acid. In carrying out this reaction, the starting material, either 1-lower alkanoyl-3-cyano-4-amino-1,2,5,6-tetrahydropyridine or 1-lower alkanoyl-3-cyano-4-ketohexahydropyridine, is suspended in tertiary butyl acetate and 70% perchloric acid added thereto while maintaining the temperature at about 10° C. After completion of the reaction, the product is recovered using procedures as described above.

The N-t-butyl-1-acyl-4-ketohexahydronicotinamide is reduced to the corresponding 4-hydroxy compound by either chemical or catalytic reduction procedures. Thus, the product can be reduced by reaction with a suitable reducing agent such as an alkali metal borohydride, for example, sodium borohydride. Alternatively, the process is effected by intimately contacting the 4-keto compound in solution with hydrogen in the presence of a suitable noble metal hydrogenation catalyst such as palladium or reduced platinum oxide.

The resulting 4-hydroxy compound is then acylated in the next step of our process to produce the corresponding 4-acyloxy compound. Thus, the product of the reduction reaction, which may be either the cis or the trans isomer, is intimately contacted with an acylating agent, preferably a lower alkanoyl acylating agent, to produce the corresponding 4-acyloxy compound. For example, the acylation can be carried out by intimately contacting the 4-hydroxy compound with a lower alkanoyl anhydride or halide in the presence of an acid-binding agent. Although any of the various lower alkanoyl anhydrides or acid halides can be used for this purpose, we prefer to effect the reaction utilizing acetic anhydride or acetyl chloride, since these products are most readily available.

In the next step of our process, the N-t-butyl-1-acyl-4-acyloxyhexahydronicotinamide is heated in contact with a noble metal to effect simultaneously the aromatization of the pyridine ring and the removal of the substituents at positions 1 and 4. This dehydrogenation reaction is effected by heating the substituted hexahydronicotinamide compound in intimate contact with a noble metal such as finely-divided palladium, platinum, ruthenium, rhodium, osmium, or iridium or one of these noble metals supported on a suitable carrier such as carbon. The metal and the hexahydronicotinamide compound are intimately mixed at temperatures of between 100–300° C. for a period of 1–10 hours to produce the desired N-t-butylnicotinamide. In the preferred method of opertion, the compound to be dehydrogenated is disolved in an inert solvent such as a high-boiling ether or hydrocarbon having a boiling point of between about 100–300° C. The noble metal is added and the resulting reaction mixture is heated for sufficient time to complete the dehydrogenation. Suitable solvents which can be used in this process include saturated polycyclic hydrocarbons such as decalin or stilbene or a high-boiling ether such as diphenyl ether. The amount of noble metal used in this dehydrogenation is not critical, and quantities ranging from about 1% to about 100% based on the weight of the compound being dehydrogenated can be used, depending upon the particular noble metal and the reaction conditions employed. After the reaction is complete, the product is readily recovered from the resulting reaction mixture by diluting it with a suitable solvent, removing the noble metal, and extracting the filtered reaction mixture with an acidic aqueous solution from which the product can then be recovered by extraction with a suitable solvent after the acid solution has been made alkaline.

The N-t-butylnicotinamide so obtained can then be hydrolyzed to produce nicotinamide. This is conveniently accomplished by dissolving the N-t-butyl compound in concentrated sulfuric acid and recovering the nicotinamide by diluting the reaction mixture with water, making the resulting solution alkaline, and extracting the nicotinamide with a suitable solvent such as chloroform. Evaporation of the resulting chloroform extract affords the desired nicotinamide.

The following examples are given to illustrate specific methods of carrying out the processes of this invention:

EXAMPLE 1

N-t-butyl-1-acetyl-4-ketohexahydronicotinamide

To a solution of 13,2 grams of 1-acetyl-3-cyano-4-ketohexahydropyridine in 350 ml. of acetic acid is added 37 ml. of concentrated sulfuric acid while maintaining the reaction mixture at 20° C. To the stirred reaction mixture is added gaseous isobutylene while maintaining the reaction mixture at less than 20° C. for about 1 hour, during which time the volume of the reaction mixture increases about 96 ml. and the product, N-t-butyl-1-acetyl-4-ketohexahydronicotinamide, is formed. The entire reaction mixture is then maintained for approximately 19 hours at 20° C. and the mixture then diluted with 450 ml. of ice water. The entire reaction mixture is then concentrated under reduced pressure to remove t-butyl alcohol while maintaining the temperature at less than 40° C. After removal of the alcohol, the remaining aqueous solution of the product is made alkaline with sodium carbonate saturated with sodium chloride and the product extracted with ethyl acetate. The ethyl acetate extract of product is then washed with sodium chloride solution, dried, and concentrated to yield a yellow, oily residue which crystallizes from ether to provide N-t-butyl-1-acetyl-4-ketohexahydronicotinamide in excellent yield. M.P. 96–98° C., $\lambda_{max.}^{CH_3OH}$ (sh.) 243 m$\mu$ (E, 720); $\lambda_{max.}^{CH_3OH+NaOH}$ 278 m$\mu$ (E, 12,500); $\lambda_{max.}^{chf}$ 2.9–2.98, 5.84, 6.02–6.2, 6.57$\mu$.

Similarly, 1-acetyl-3-cyano-4-amino-1,2,5,6-tetrahydropyridine is treated as above to give the same product.

In similar manner, when other 1-acyl derivatives of 3-cyano-4-ketohexahydropyridine or 3-cyano-4-amino-1,2,5,6-tetrahydropyridine such as other 1-lower alkanoyl compounds, for example, the 1-propionyl, 1-butyryl, or the 1-hexyl derivatives, are reacted with isobutylene in a mixture of acetic acid and sulfuric acid, the corresponding 1-acyl-3-cyano-4-ketohexahydropyridines are obtained.

The 1-acetyl-3-cyano-4-ketohexahydropyridine used as the starting material in the foregoing example can be prepared as follows:

To a stirred slurry of 32.0 grams of 3-cyano-4-amino-1,2,5,6-tetrahydropyridine in 300 ml. of pyridine is added 150 ml. of acetic anhydride while cooling the reaction mixture to maintain the temperature at about 30° C. During a period of about 15–20 minutes, the stirred material dissolved in solution gives a light yellow solution and the product begins to precipitate. The reaction is allowed to proceed for an additional 1½ hours and the precipitated product is removed by filtration, washed successively with toluene and ether and air dried to give substantially pure 1-acetyl-3-cyano-4-amino-1,2,5,6-tetrahydropyridine, M.P. 174–177° C. On recrystallization of the product from acetone, the product exhibits the following characteristics: M.P. 177–178° C.;

$\lambda_{max.}^{MeOH}$ 263 m$\mu$ (E, 11,600); $\lambda_{max.}^{Nujol}$ 2.92

2.99, 3.09 (N–H), 4.64 (C≡N), 6.06, 6.15$\mu$ (—NH$_2$ and N—COCH$_3$).

When the above procedure is repeated using in place of the acetic anhydride reactant the equivalent molar amount of butyric acid anhydride, hexanoic acid anhydride, propionic acid anhydride, or valeric acid anhydride, 1-butyryl-3-cyano-4-amino-1,2,5,6-tetrahydropyridine, 1-hexanoyl-3-cyano-4-amino-1,2,5,6-tetrahydropyridine, 1-propionyl-3-cyano-4-amino-1,2,5,6-tetrahydropyridine and 1-valeryl-3-cyano-4-amino-1,2,5,6-tetrahydropyridine are obtained.

Similarly, these compounds are produced, respectively, when in place of the corresponding anhydride the acid chloride or bromide is utilized as the acylating agent.

A solution of 1 gram of 1-acetyl-3-cyano-4-amino-1,2,5,6-tetrahydropyridine in 3 ml. of 2.5 N aqueous hydrochloric acid is prepared and allowed to stand at room temperature (25° C.) for approximately 10 minutes. The entire reaction mixture is then neutralized with aqueous 2.5 N sodium hydroxide solution and concentrated in vacuo leaving the product as a residue. The residual material is flushed with methanol and toluene to remove impurities and subsequently acidified to pH 4 with aqueous 2.5 N hydrochloric acid and again concentrated to dryness. The residual partially-pure product is flushed with two portions of benzene to remove additional impurities and the remaining residue containing the product is extracted by slurrying with five 15 ml. portions of hot acetone. The acetone solution of product is then filtered to remove insoluble, inorganic impurities and the acetate filtrate containing the product concentrated in vacuo to yield substantially pure 1-acetyl-3-cyano-4-ketohexahydropyridine in excellent yield.

EXAMPLE 2

Alternative procedure for preparing N-t-butyl-1-acetyl-4-ketohexahydronicotinamide 5 ml. of 70% perchloric acid is added to a stirred suspension of 3.31 grams of 1-acetyl-3-cyano-4-ketohexahydropyridine in 38 ml. of t-butyl acetate over a period of about 20 minutes while maintaining the temperature of the reaction mixture at about 10° C. Stirring is continued for approximately 17 hours at 20-25° C. and then the entire reaction mixture diluted with crushed ice and the t-butyl alcohol formed is removed by distillation of the reaction mixture under reduced pressure while maintaining the temperature of the reaction mixture below 40° C. The resulting aqueous solution of the product is adjusted to pH 9-10 with aqueous sodium hydroxide and maintained at room temperature for approximately 3 hours. The entire reaction mixture is then acidified with 2.5 N hydrochloric acid, saturated with salt, and the product extracted with methylene chloride. The methylene chloride extract of the product is then washed with salt water, dried, and concentrated to produce the product in the form of a yellow oil which crystallizes readily from ether diluted with a small amount of acetone. M.P. 96-98° C.

Similarly, 1-acetyl-3-cyano-4-amino-1,2,5,6-tetrahydropyridine is treated as above to give the same product.

In the same way, other 1-acyl derivatives of 3-cyano-4-ketohexahydropyridine such as other lower alkanoyl derivatives, for example, the 1-propionyl, 1-butyryl, or the 1-hexyl derivatives, can be reacted with t-butyl acetate in the presence of perchloric acid to produce the corresponding 1-acyl derivatives of N-t-butyl-4-ketohexahydronicotinamide.

EXAMPLE 3

Trans-N-t-butyl-1-acetyl-4-hydroxyhexahydronicotinamide

A solution of 500 mg. of sodium borohydride in 20 ml. of water containing 2 drops of 2.5 N sodium hydroxide is added dropwise to a stirred solution of 2.2 grams of N-t-butyl-1-acetyl-4-ketohexahydronicotinamide in 40 ml. of water. The reaction is maintained at 25° C. for about 2½ hours with stirring to form the product in excellent yield. The product is recovered by acidification of the reaction mixture with 50% aqueous acetic acid, concentrated in vacuo, and the product extracted from the resulting residue with chloroform. The chloroform extract, after drying, crystallizes from acetone ether. M.P. 157-163° C. Recrystallization gives substantially pure product. M.P. 167-168° C.

$\lambda_{max.}^{Nujol}$ 2.85–3.03 (OH), 6.02–6.17$\mu$

The corresponding cis isomer is obtained by chromatography of the mother liquor of the crystallization of the trans isomer on alumina and elution of the alumina with a mixture of chloroform and benzene.

When other 1-acyl derivatives of N-t-butyl-4-ketohexahydronicotinamide such as other 1-lower alkanoyl derivatives, for example, the 1-propionyl, 1-valeryl, or the 1-hexyl derivative is reduced by the above procedure, the corresponding 1-acyl-4-hydroxy compound is produced.

EXAMPLE 4

Trans-N-t-butyl-1-acetyl-4-acetoxyhexahydronicotinamide

Approximately 1.0 gram of trans-t-butyl-1-acetyl-4-hydroxyhexahydronicotinamide is dissolved in 2.5 ml. of acetic anhydride and 5 ml. of pyridine to produce trans-N-t-butyl-1-acetyl-4-acetoxyhexahydronicotinamide, which is obtained in quantitative yield on evaporation of the mixture of excess acetic anhydride and pyridine. M.P. 165-166° C.

Similarly, upon reaction with other lower alkanoyl anhydrides or a lower alkanoyl halide such as the chloride or bromide, the corresponding 4-acyloxy compound is obtained.

EXAMPLE 5

Cis-N-t-butyl-1-acetyl-4-hydroxyhexahydronicotinamide

A solution of 961 mg. of N-t-butyl-1-acetyl-4-ketohexahydronicotinamide in 20 ml. of methanol is mixed with a pre-reduced suspension of platinum oxide in 10 ml. of methanol and shaken in an atmosphere of hydrogen at atmospheric pressure to produce cis-N-t-butyl-1-acetyl-4-hydroxyhexahydronicotinamide in excellent yield. The catalyst is removed from the reaction mixture by filtration and the product is obtained from the filtrate as a residual clear, colorless oil after evaporation of the methanol.

$\lambda_{max.}^{Nujol}$ 2.86–3.03, 6.02–6.17$\mu$

Similarly, other 1-acyl derivatives such as other 1-lower alkanoyl compounds can be reduced to produce the corresponding N-t-butyl-1-acyl-4-hydroxyhexahydronicotinamide.

EXAMPLE 6

Cis-N-t-butyl-1-acetyl-4-acetoxyhexahydronicotinamide

A solution of 740 mg. of cis-N-t-butyl-1-acetyl-4-hydroxyhexahydronicotinamide in 5 ml. of pyridine and 2.5 ml. of acetic anhydride is maintained at room temperature for about 16 hours. The product, cis-N-t-butyl-1-acetyl-4-acetoxyhexahydronicotinamide, is produced in substantially pure form by evaporation of the entire reaction mixture under reduced pressure and crystallization of the residue from a mixture of acetone-ether, M.P. 184-187° C.

In the same way, other 4-lower alkanoyloxy compounds can be produced using other lower alkanoyl anhydrides.

EXAMPLE 7

N-t-butylnicotinamide

A mixture of 800 mg. of cis-N-t-butyl-1-acetyl-4-acetoxyhexahydronicotinamide, 800 mg. of 30% palladium on charcoal catalyst, and 50 ml. of decalin having a boiling point of 190-192° C. is maintained at the reflux temperature for approximately 16 hours under a nitrogen atmosphere during which time hydrogen gas is evolved and the product, N-t-butylnicotinamide, is obtained. The entire reaction mixture is then diluted with methylene chloride and the palladium catalyst removed from the reaction mixture by filtration. The filtrate is extracted with 2.5 N aqueous hydrochloric acid to remove the product and the acid extract then washed with methylene chloride. The aqueous acidic solution of the product is then made alkaline with 2.5 N aqueous sodium hydroxide solution, saturated with salt, and the product extracted with methylene chloride. The product is then obtained in substantially pure form from the dried methylene chloride extract by concentration in vacuo. The crystalline residue obtained is recrystallized from acetone-ether-petroleum-ether. M.P. 85–86° C.

The trans form of the starting material can be similarly dehydrogenated to produce N-t-butylnicotinamide. In the same way, the cis and trans forms of other lower alkanoyl esters can be converted to the nicotinamide derivative by the above-described procedure.

EXAMPLE 8

Nicotinamide

N-t-butylnicotinamide (440 mg.) is added in portions to a stirred solution of 10 ml. of concentrated sulfuric acid at 0° C. After about ½ hour, complete solution is realized and the reaction mixture is allowed to warm to about 25° C. After 2 additional hours at 25° C., the mixture is poured portionwise onto about 15 ml. of crushed ice with stirring, made alkaline with sodium hydroxide, and extracted with chloroform. After drying over magnesium sulfate, the chloroform extract is concentrated to an oil from which the nicotinamide is crystallized upon the addition of ether.

EXAMPLE 9

Preparation of 1-acetylhexahydronicotinamide

N-t-butyl-1-acetylhexahydronicotinamide (440 mg.) is added in portions to a stirred solution of 10 ml. of concentrated sulfuric acid at 0° C. Complete solution is realized within ½ hour. The yellow reaction mixture is then allowed to warm to 25° C. After 2 additional hours at 25° C., the mixture is poured portionwise onto ca. 15 ml. of crushed ice wtih stirring, neutralized with aqueous sodium hydroxide to phenolphthalein, and concentrated in vacuo to dryness. Chloroform is added and the inorganic salts removed by filtration. The organic extract is dried over magnesium sulfate and concentrated to afford 381 mg. of oil which crystallizes upon trituration with ether. First crop; 265 mg., M.P. 140–141° C.;

$\lambda_{max.}^{Chloroform}$ 2.84

2.88, 2.94, 3.0, 3.14, 6.02, 6.15µ; second crop; 7 mg. M.P. 135–139° C. Both crops show a single spot on paper (formamide-chloroform system). An analytical sample prepared by recrystallization from acetone-ether melts at 141–142° C.

What is claimed is:
1. The process for producing nicotinamide which comprises the step of:
   (a) contacting a 1-lower alkanoyl-3-cyano-4-ketohexahydropyridine or 1-lower alkanoyl-3-cyano-4-amino-1,2,5,6-tetrahydropyridine in a strong acid reaction medium with a source of tertinary butyl ions to produce N-t-butyl-1-lower alkanoyl-4-ketohexahydronicotinamide;
   (b) contacting said N-t-butyl-1-lower alkanoyl-4-ketohexahydronicotinamide with a reducing agent selected from the group consisting of alkali metal borohydrides or hydrogen in the presence of a noble metal hydrogenation catalyst to produce N-t-butyl-1-lower alkanoyl-4-hydroxy hexahydronicotinamide;
   (c) contacting said N-t-butyl-1-lower alkanoyl-4-hydroxy hexahydronicotinamide with a lower alkanoyl acylating agent to produce N-t-butyl-1-lower alkanoyl-4-lower alkanoyloxyhexahydronicotinamide;
   (d) heating said N-t-butyl-1-lower alkanoyloxy-4-hydroxyhexahydronicotinamide at a temperature of between 100–300° C. in an inert solvent in the presence of pallidum, platinum, ruthenium, rhodium, asmium or iridium to produce N-t-butyl nicotinamide and
   (e) hydrolyzing said N-t-butyl nicotinamide to obtain nicotinamide.

2. The process which comprises contacting N-t-butyl-1-lower alkanoyl-4-lower alkanoyloxyhexahydronicotinamide with palladium, platinum, ruthenium, rhodium, asmium or iridium at a temperature of between 100–300° C. and in an inert solvent to produce N-t-butylnicotinamide.

3. The process of claim 2 wherein N-t-butyl-1-acetyl-4-acetoxyhexahydronicotinamide is reacted.

References Cited

Kushner et al. Chemical Abstracts, vol. 43, Par. 5025-e (1949).

HENRY R. JILES, *Primary Examiner.*

ALAN J. ROTMAN, *Assistant Examiner.*

U.S. Cl. X.R

260—294, 294.3, 294.9